(12) United States Patent
Mori et al.

(10) Patent No.: US 10,913,497 B2
(45) Date of Patent: Feb. 9, 2021

(54) UPPER SLEWING BODY

(71) Applicants: Kobe Steel, Ltd., Kobe (JP);
KOBELCO CONSTRUCTION MACHINERY CO., LTD., Hiroshima (JP)

(72) Inventors: Yoshimune Mori, Kobe (JP); Masaya Nishizawa, Hyogo (JP)

(73) Assignees: Kobe Steel, Ltd., Kobe (JP);
KOBELCO CONSTRUCTION MACHINERY CO., LTD., Hiroshima (JP)

( * ) Notice: Subject to any disclaimer, the term of this patent is extended or adjusted under 35 U.S.C. 154(b) by 151 days.

(21) Appl. No.: 16/330,139

(22) PCT Filed: Sep. 15, 2017

(86) PCT No.: PCT/JP2017/033391
§ 371 (c)(1),
(2) Date: Mar. 4, 2019

(87) PCT Pub. No.: WO2018/056192
PCT Pub. Date: Mar. 29, 2018

(65) Prior Publication Data
US 2019/0256153 A1    Aug. 22, 2019

(30) Foreign Application Priority Data
Sep. 23, 2016   (JP) .................................. 2016-185701

(51) Int. Cl.
*B62D 21/18*   (2006.01)
*E02F 9/08*    (2006.01)
(Continued)

(52) U.S. Cl.
CPC .............. *B62D 21/18* (2013.01); *B66C 13/52* (2013.01); *B66C 23/36* (2013.01); *B66C 23/62* (2013.01);
(Continued)

(58) Field of Classification Search
CPC ......... B62D 21/18; B66C 23/36; B66C 23/62; B66C 13/52; E02F 9/0808; E02F 9/0833; E02F 9/0866; E02F 9/08
See application file for complete search history.

(56) References Cited

U.S. PATENT DOCUMENTS 10,494,038 B2 * 12/2019 Irie ........................ B62D 21/18
2009/0159346 A1    6/2009 Kobayashi

FOREIGN PATENT DOCUMENTS

| JP | 2000-144811 A | 5/2000 |
|----|---------------|--------|
| JP | 2004-239015 A | 8/2004 |

(Continued)

OTHER PUBLICATIONS

International Search Report dated Dec. 5, 2017 in PCT/JP2017/033391 filed Sep. 15, 2017.

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

Transmission of vibration from an engine to a cab is suppressed. An upper slewing body includes a slewing frame, an engine deck, a cab deck, a tank deck, and a vibration transmission regulating unit. The tank deck is arranged on the more laterally outer side than the slewing frame and is fixed to the slewing frame. The tank deck is arranged forward of the engine deck and is arranged rearward of the cab deck. The vibration transmission regulating unit is provided between the engine deck and the tank deck (Continued)

to regulate direct transmission of vibration from the engine deck to the tank deck, the vibration occurring as the engine operates.

6 Claims, 8 Drawing Sheets

(51) Int. Cl.
  *B66C 23/36* (2006.01)
  *B66C 23/62* (2006.01)
  *B66C 13/52* (2006.01)
(52) U.S. Cl.
  CPC .............. *E02F 9/08* (2013.01); *E02F 9/0808* (2013.01); *E02F 9/0833* (2013.01); *E02F 9/0866* (2013.01)

(56) References Cited

FOREIGN PATENT DOCUMENTS

| | | |
|---|---|---|
| JP | 2009-149434 A | 7/2009 |
| JP | 2016-44513 A | 4/2016 |

* cited by examiner

UPPER SLEWING BODY

TECHNICAL FIELD

The present invention relates to an upper slewing body of a construction machine.

BACKGROUND ART

Patent Literature 1 (see FIG. 1) discloses a conventional upper slewing body. The upper slewing body disclosed in Patent Literature 1 is equipped with a deck (a deck frame in Patent Literature 1). An engine and a cab are mounted on the deck.

CITATION LIST

Patent Literature

Patent Literature 1: JP 2009-149434 A

SUMMARY OF INVENTION

In the upper slewing body disclosed in Patent Literature 1, vibration of the engine is transmitted to the cab via the deck. Therefore, vibration of the cab is a problem. For example, the vibration affects operator's riding comfort of the cab.

In view of the above problem, an object of the present invention is to provide an upper slewing body capable of suppressing transmission of vibration from an engine to a cab.

An upper slewing body of the present invention has a slewing frame, a cab deck, a tank deck, and a vibration transmission portion regulating unit. The slewing frame is slewable around a rotation shaft extending in an up-down direction. The engine deck is arranged to be opposed to the slewing frame in a lateral direction intersecting a front-rear direction and the up-down direction and is fixed to the slewing frame to support an engine. The cab deck is arranged on the same side as the engine deck in the lateral direction and arranged forward of the engine deck and is fixed to the slewing frame to support a cab. The tank deck is arranged on the same side as the engine deck in the lateral direction and arranged forward of the engine deck and rearward of the cab deck and is fixed to the slewing frame to support a tank. The vibration transmission portion regulating unit regulates direct transmission of vibration from the engine deck to the tank deck on a laterally outer side of the slewing frame, the vibration occurring as the engine operates.

By the above-described configuration, transmission of vibration from the engine to the cab can be suppressed.

DESCRIPTION OF EMBODIMENTS

Figure 1:
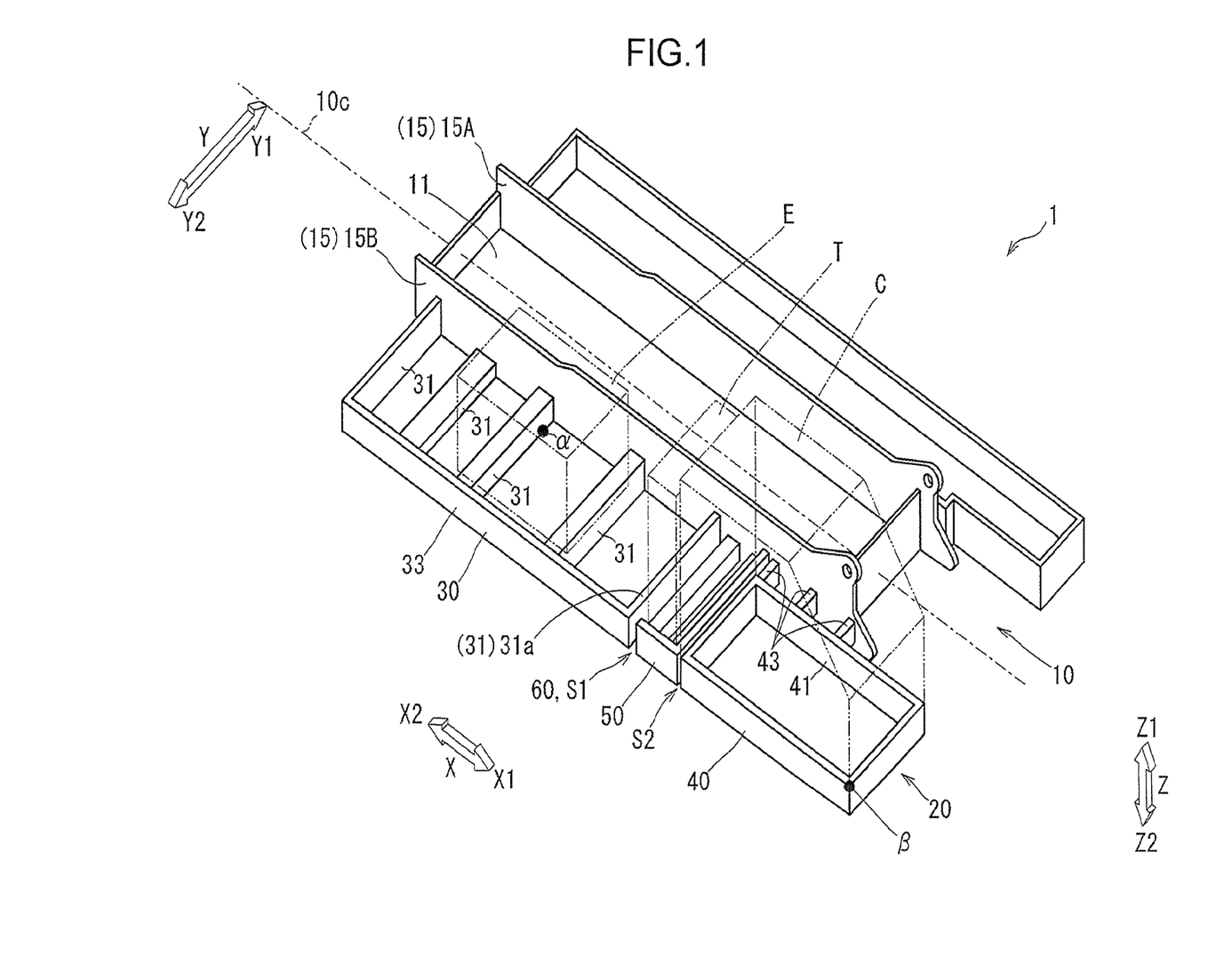
FIG. 1 is a perspective view of an upper slewing body according to one embodiment of the present invention.
Figure 2:
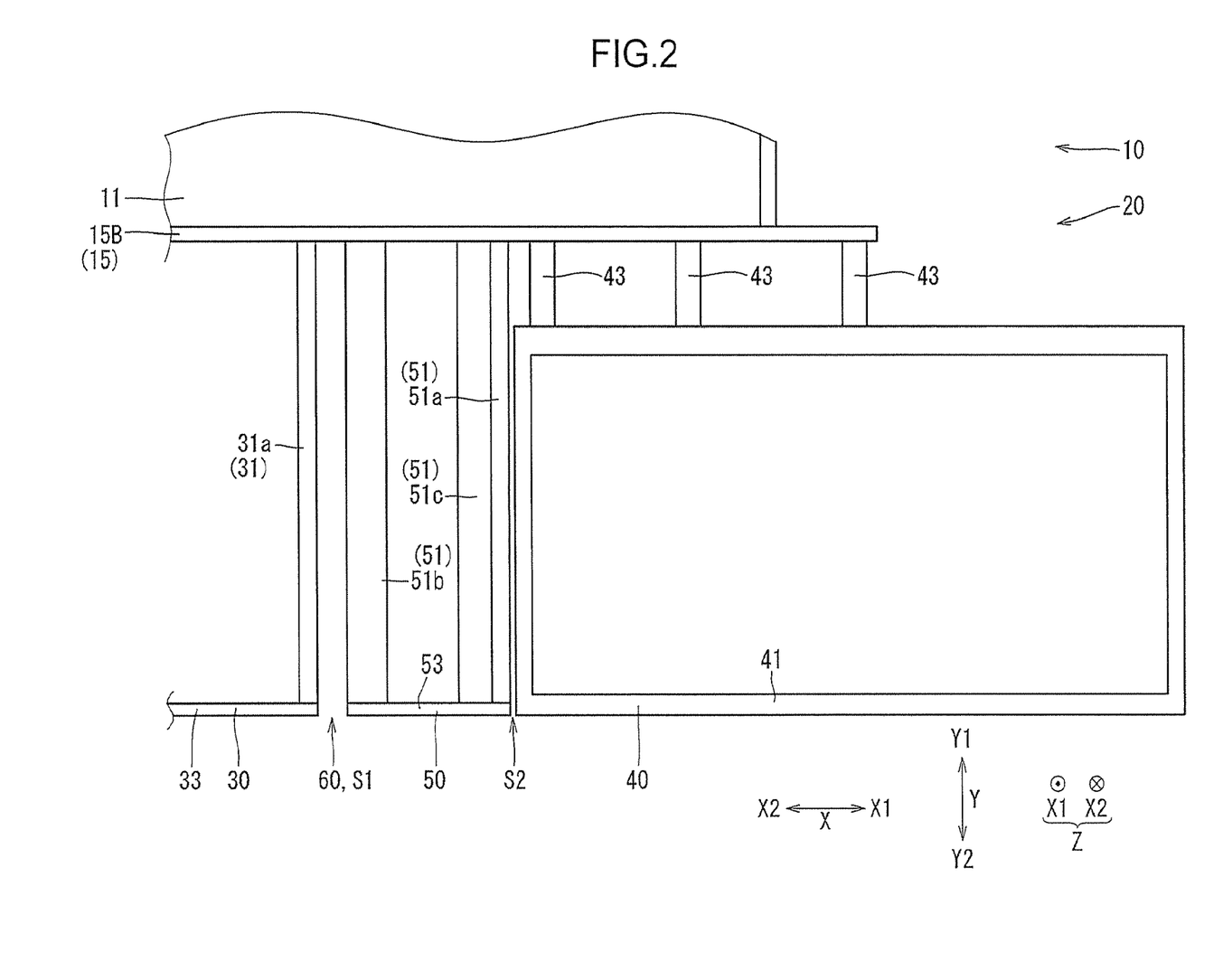
FIG. 2 is a view of a part of the upper slewing body shown in FIG. 1, as seen from above.
Figure 3:
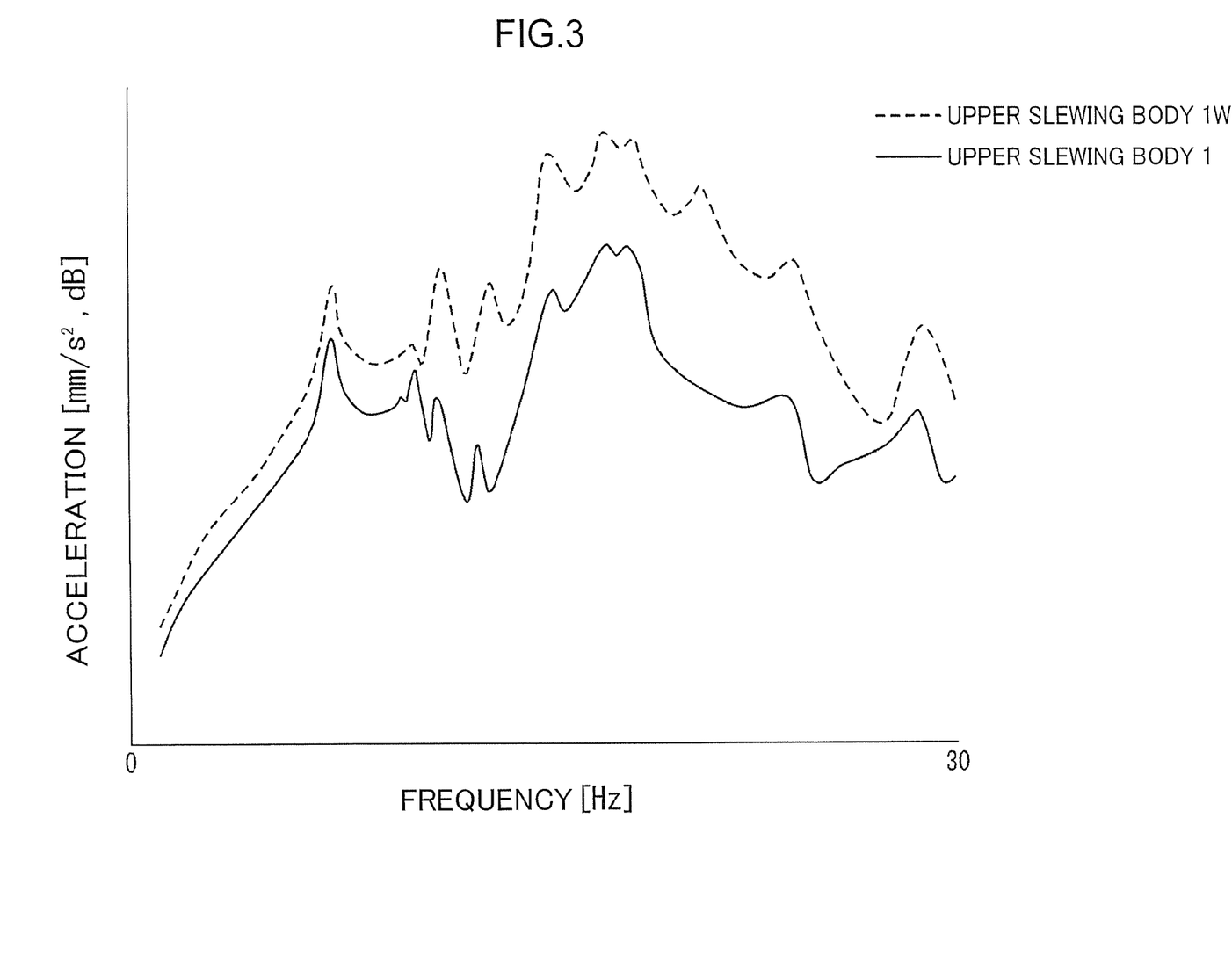
FIG. 3 is a graph showing relations between frequency and acceleration of vibration at a response point β in the upper slewing body shown in FIG. 1 and FIG. 8.

With reference to FIG. 1 to FIG. 3, an upper slewing body 1 shown in FIG. 1 will be described. FIG. 1 is a perspective view of the upper slewing body 1 according to one embodiment of the present invention. FIG. 2 is a view of a part of the upper slewing body 1 shown in FIG. 1, as seen from above. FIG. 3 is a graph showing relations between frequency and acceleration of vibration at a response point β in the upper slewing body 1 shown in FIG. 1 and FIG. 8.

The upper slewing body 1 (an upper slewing body structure) is used for a construction machine. A construction machine for which the upper slewing body 1 is used is, for example, a crane such as a movable crane or a lattice boom crawler crane. The upper slewing body 1 is mounted on a lower traveling body (not shown) of a construction machine and is slewable around a rotation shaft extending in an up-down direction with respect to the lower traveling body. The upper slewing body 1 includes a slewing frame 10 and a deck 20.

The slewing frame 10 (also referred to as a center section) is attached to the lower traveling body (not shown). A line passing the center of the slowing frame 10 in a right-left direction, which is a center line extending in a longitudinal direction of the slewing frame 10, is defined as a center line 10c. The longitudinal direction (the direction in which the center line 10c extends) of the slewing frame 10 is defined as a front-rear direction X. In the front-rear direction X, a direction from an engine deck 30 toward a cab deck 40 to be described later is defined as a front direction X1, and a direction reverse to the front direction X1 is defined as a rear direction X2. A horizontal direction (the right-left direction) perpendicular to the longitudinal direction of the slewing frame 10 is defined as a lateral direction Y. In the lateral direction Y, a side coming closer to the center line 10c is defined as a laterally inner side Y1, and a side going away from the center line 10c is defined as a laterally outer side Y2. A direction perpendicular (vertical direction) to the front-rear direction X and to the lateral direction Y is defined as an up-down direction Z. The up-down direction Z includes an upward direction Z1 and a downward direction Z2. The slewing frame 10 includes a bottom plate 11 and a plurality of side plates 15.

The bottom plate 11 is a plate-shaped structure forming a bottom portion (lower side part) of the slewing frame 10. The above "plate-shaped" may be substantially plate-shaped (the same is also applied to other members below). A thickness direction of the bottom plate 11 is parallel to the up-down direction Z.

The plurality of side plates 15 is a plate-shaped structure which defines a laterally outer side portion (surface) of the slewing frame 10. A thickness direction of the side plate 15 is parallel to the lateral direction. In the present embodiment, the plurality of side plates 15 includes two side plates 15. The two side plates 15 protrude (extend) upwardly from the bottom plate 11, and in the present embodiment, the two side plates 15 upwardly protrude from both end portions at the laterally outer sides of the bottom plate 11. "End portion" represents an end and the proximity of the end (the same is also applied to other members below). The two side plates 15 include a first side plate 15A and a second side plate 15B. The first side plate 15A and the second side plate 15B are arranged to be opposed to each other in the lateral direction. The second side plate 15B is arranged closer to the deck 20 than to the first side plate 15A.

The deck 20 is a structure which allows a device and the like to be mounted. The deck 20 includes the engine deck 30, the cab deck 40, a tank deck 50, and a vibration transmission regulating unit 60 (also referred to as cut-off means or a cut-off unit).

A vibration source such as an engine E is mounted on the engine deck 30. A vibration source (a hydraulic pump not shown or the like) other than the engine E can be mounted on the engine deck 30. For example, a radiator, a fan, an exhaust gas purification device, and an engine guard for protecting (covering) a device (which are not shown) may be mounted on the engine deck 30. The engine deck 30 is arranged on the more laterally outer side than the slewing frame 10. The engine deck 30 is fixed (connected) to the slewing frame 10 and is fixed to the second side plate 15B. In other words, the engine deck 30 is arranged to be opposed to the slewing frame 10 in the lateral direction intersecting the front-rear direction and the up-down direction and is fixed to the slewing frame 10 to support the engine E and the like. The engine deck 30 includes a plurality of engine deck lateral members 31 and an engine deck outer side member 33.

The plurality of engine deck lateral members 31 are members (beams) extending in the lateral direction. Each engine deck lateral member 31 is fixed to the slewing frame 10, more specifically, is fixed to the second side plate 15B. Each engine deck lateral member 31 extends from the second side plate 15B to the laterally outer side. The number of engine deck lateral members 31, which is five in the example shown in FIG. 1, may be four or less, or six or more. The plurality of engine deck lateral members 31 include an engine deck front end member 31a.

The engine deck front end member 31a forms a front side end portion of the engine deck 30. The engine deck front end member 31a connects a front side end portion of the engine deck outer side member 33 and the second side plate 15B of the slewing frame 10. The engine deck front end member 31a is plate-shaped, for example. A thickness direction of the engine deck front end member 31a is parallel to the front-rear direction. The engine deck front end member 31a may not be plate-shaped and may be, for example, bar-shaped or the like (the same applies to the engine deck outer side member 33). The engine deck front end member 31a extends along the lateral direction and is also connected to the slewing frame 10 to define a front surface portion of the engine deck 30.

The engine deck outer side member 33 forms a laterally outer side portion of the engine deck 30. The engine deck outer side member 33 is fixed to the engine deck lateral member 31 and is fixed to a laterally outer side end portion of the engine deck lateral member 31. The engine deck outer side member 33 extends in the front-rear direction. The engine deck outer side member 33 is plate-shaped, for example. A thickness direction of the engine deck outer side member 33 is parallel to the lateral direction. The engine deck outer side member 33 extends along the front-rear direction and also defines the laterally outer side portion of the engine deck 30. The above engine deck front end member 31a connects a front end portion of the engine deck outer side member 33 and the slewing frame 10 along the lateral direction.

A cab C (operation room) is mounted on the cab deck 40. The cab deck 40 is arranged on the more laterally outer side than the slewing frame 10. The cab deck 40 is fixed to the slewing frame 10, more specifically, is fixed to the second side plate 15B. The cab deck 40 is arranged forward of the engine deck 30. In other words with respect to the cab deck 40, the cab deck 40 is arranged on the same side of the engine deck 30 in the lateral direction and is arranged forward of the engine deck 30, and is fixed to the slewing frame 10 to support the cab C. The cab deck 40 includes a frame portion 41 and a plurality of support beams 43.

The frame portion 41 foil is an outer circumference portion of the cab deck 40 (an outer circumference portion of the cab deck 40 viewed along the up-down direction). The frame portion 41 is a square (including substantially square) viewed in the up-down direction and is, for example, a rectangle (including substantially rectangular) and extends along the front-rear direction. The frame portion 41 is formed with a plate-shaped member extending in the up-down direction. The plurality of support beams 43 support the frame portion 41. The plurality of support beams 43 are fixed to the slewing frame 10, specifically, is fixed to the second side plate 15B. Then, the plurality of support beams 43 each extends from the second side plate 15B to the laterally outer side. The plurality of support beams 43 are connected to a laterally inner side portion of the frame portion 41. The number of the plurality of support beams 43 is, for example, three, and may be two or four or more. The plurality of support beams 43 are arranged to be spaced apart from each other in the front-rear direction.

A tank T is mounted on the tank deck 50. The tank T stores fluid. The tank T is, for example, a hydraulic oil tank, and may be a urea water tank or a fuel tank, for example. The number of tanks T may be one, or be plural. A kind of the tank T (a hydraulic oil tank, a urea water tank, a fuel tank etc.) may be one kind or a plurality of kinds. The tank T is arranged to substantially cover a rear side portion of the cab C. A device (an auxiliary device) to be connected to the tank T, and a guard for protecting (covering) the tank T may be mounted on the tank deck 50 (each not shown). The tank deck 50 is arranged on the more laterally outer side than the slewing frame 10. The tank deck 50 is fixed to the slewing frame 10 and is fixed to the second side plate 15B. The tank deck 50 is arranged forward of the engine deck 30 and is arranged to be opposed to the engine deck 30 in the front-rear direction. The tank deck 50 is arranged rearward of the cab deck 40 and is arranged to be opposed to the cab deck 40 in the front-rear direction. A gap S2 may be provided between the tank deck 50 and the cab deck 40, or the gap S2 may not be provided. In other words with respect to the tank deck 50, the tank deck 50 is arranged on the same side as the engine deck 30 in the lateral direction and is arranged forward of the engine deck 30 and rearward of the cab deck 40, and is fixed to the slewing frame 10 to support the tank T. The tank deck 50 includes a plurality of tank deck lateral members 51 and a tank deck outer side member 53.

The plurality of tank deck lateral members 51 are each a member extending in the lateral direction. Each tank deck lateral member 51 is fixed to the slewing frame 10, specifically, is fixed to the second side plate 15B. Then, each tank deck lateral member 51 extends from the second side plate 15B to the laterally outer side. In the present embodiment, the plurality of tank deck lateral members 51 include three tank deck lateral members 51 as shown in FIG. 2. The three tank deck lateral members 51 include a tank deck front end member 51a, a tank deck rear end member 51b, and a tank deck center member 51c.

The tank deck front end member 51a forms a front side end portion of the tank deck 50. The tank deck front end member 51a is, for example, plate-shaped. A thickness direction of the tank deck front end member 51a is parallel to the front-rear direction. The tank deck rear end member 51b forms a rear side end portion of the tank deck 50. In other words, the tank deck rear end member 51b extends along the lateral direction and is also connected to the slewing frame 10 to define a rear surface portion of the tank deck 50. The tank deck rear end member 51b is, for example, bar-shaped. The tank deck rear end member 51b may be a channel material having a substantially C-shaped section, or an angled material having a substantially L-shaped section, may have a substantially H-shaped section, or a substantially I-shaped section, or may be a quadrangular prism (the same is also applied to other bar-shaped members). The tank deck center member 51c is arranged rearward of the tank deck front end member 51a and is arranged forward of the tank deck rear end member 51b. The tank deck center member 51c is, for example, bar-shaped. The tank deck front end member 51a may not be plate-shaped and may be, for example, bar-shaped. The tank deck rear end member 51b may not be bar-shaped and may be, for example, plate-shaped or the like. Although the number of tank deck center members 51c is one in FIG. 2, two or more of the tank deck center members 51e may be arranged. The tank deck 50 may be configured without the tank deck center member 51c.

The tank deck outer side member 53 forms a laterally outer side end portion of the tank deck 50. The tank deck outer side member 53 extends along the front-rear direction. The tank deck outer side member 53 is, for example, plate-shaped. A thickness direction of the tank deck outer side member 53 is parallel to the lateral direction. The tank deck outer side member 53 may not be plate-shaped and may be bar-shaped or the like.

The vibration transmission regulating unit 60, which is provided between the engine deck 30 and the tank deck 50, is means (a part, a member, a device, or the like) for cutting off a vibration transmission path from the engine deck 30 to the tank deck 50. For example, the vibration transmission regulating unit 60 cuts off a vibration transmission path from the engine deck 30 to the tank deck 50 in the front-rear direction. For example, the vibration transmission regulating unit 60 may cut off a vibration transmission path in a direction other than the front-rear direction from the engine deck 30 to the tank deck 50, or may cut off a vibration transmission path in the lateral direction. In other words, the vibration transmission regulating unit 60 regulates direct transmission of vibration from the engine deck 30 to the tank deck 50 (without passing the slewing frame 10) on the laterally outer side of the slewing frame 10, the vibration occurring as the engine E operates. In the present embodiment, the vibration transmission regulating unit 60 is formed with the engine deck front end member 31a and the tank deck rear end member 51b. The vibration transmission regulating unit 60 includes a gap S1 formed in the front-rear direction between the engine deck 30 and the tank deck 50. The gap S1 is provided to extend from the laterally outer side end portions to laterally inner side end portions (connection portions to the second side plate 15B) of the engine deck 30 and the tank deck 50. The gap S1 is provided between the tank deck rear end member 51b (see FIG. 2) and the engine deck front end member 31a. In particular, in the present embodiment, the engine deck front end member 31a and the tank deck rear end member 51b are arranged at an interval (the gap S1) in the front-rear direction over the entire area in the lateral direction and the up-down direction so as to regulate direct transmission of a vibration component from the engine deck 30 to the tank deck 50, the vibration component being of the vibration of the engine E in every direction including the front-rear direction, the up-down direction, and the lateral direction.

Transmission of Vibration

Figure 8:
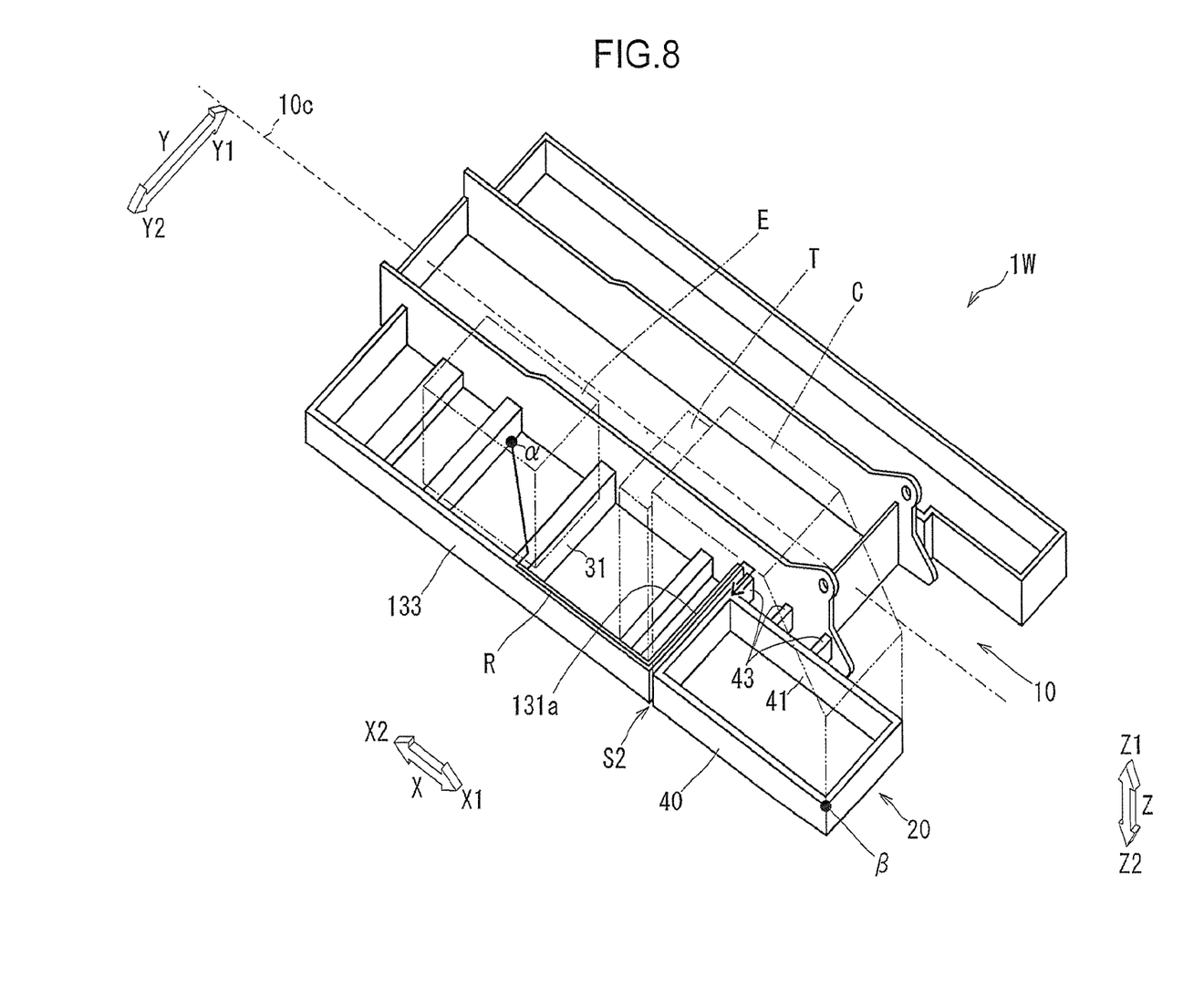
FIG. 8 is a perspective view of another upper slewing body to be compared with the upper slewing body according to the one embodiment of the present invention.

FIG. 8 is a perspective view (corresponding to FIG. 1) of another upper slewing body 1W (Comparative Example) to be compared with the upper slewing body 1 according to the present embodiment. In comparison, the upper slewing body 1W differs from the upper slewing body 1 according to the present embodiment in that the gap S1 is not provided (see FIG. 1). In FIG. 8, there is shown a dominant vibration transmission path R (a path on which vibration is more likely to be transmitted than other path) from an engine E to a cab deck 40 when the engine E is in operation (at the time of excitation). The vibration transmission path R was obtained by analysis.

Details of the vibration transmission path R are as follows. Vibration of the engine F passes through an engine deck lateral member 31 on which the engine E is mounted, and is transmitted to an engine deck outer side member 133. The vibration is transmitted from a position on a laterally outer side of the engine E to a position on a laterally outer side of a tank T (the position of the tank deck outer side member 53 shown in FIG. 1) in the engine deck outer side member 133. As shown in FIG. 8, the vibration passes from the engine deck outer side member 133 through an engine deck front end member 131a, and passes a second side plate 15B of a slewing frame 10, a support beams 43 of the cab deck 40, and a frame portion 41, and is transmitted to a cab C mounted on the frame portion 41. As a result, the cab C vibrates.

On the other hand, as shown in FIG. 1, in the upper slewing body 1 according to the present embodiment, the gap S1 is formed by arranging the engine deck front end member 31a and the tank deck rear end member 51b with an interval therebetween in the front-rear direction. As a result, a vibration transmission path from the engine deck outer side member 33 to the tank deck outer side member 53 is cut off. Accordingly, transmission of vibration from the engine E to the cab deck 40 is suppressed. As a result, vibration of the cab C is suppressed.

FIG. 3 is a graph showing relations between frequency and acceleration of vibration at the response point 3 in the upper slewing bodies 1 and 1W shown in FIG. 1 and FIG. 8. An acceleration at the response point β where an excitation point α was excited was calculated with respect to each of the other upper slewing body 1W (see FIG. 8) and the upper slewing body 1 according to the present embodiment (FIG. 1). The excitation point α corresponds to a position of the center of gravity of the engine E. The response point β corresponds to a position in a front side end portion and in a laterally outer side end portion of the cab deck 40. The response point β is a position at which vibration is particularly large in the cab deck 40. As shown in FIG. 3, as compared with the other upper slewing body 1W, in the upper slewing body 1 according to the present embodiment, acceleration resulted in being reduced over the entire range of about 0 [Hz] to 30 [Hz].

The upper slewing body 1 shown in FIG. 1 has the following effects. The upper slewing body 1 includes the slewing frame 10, the engine deck 30, the cab deck 40, the tank deck 50, and the vibration transmission regulating unit 60. The engine deck 30 is arranged on the more laterally outer side than the slewing frame 10 and is fixed to the slewing frame 10. The engine E is mounted on the engine deck 30. The cab deck 40 is arranged on the more laterally outer side than the slewing frame 10, is fixed to the slewing frame 10, and is arranged forward of the engine deck 30. The cab C is mounted on the cab deck 40. The tank deck 50 is arranged on the more laterally outer side than the slewing frame 10 and is fixed to the slewing frame 10. The tank deck 50 is arranged forward of the engine deck 30 and is arranged rearward of the cab deck 40. The tank T is mounted on the tank deck 50.

The vibration transmission regulating unit 60, which is provided between the engine deck 30 and the tank deck 50, is means for cutting off a vibration transmission path from the engine deck 30 to the tank deck 50. In other words, the vibration transmission regulating unit 60 regulates direct transmission of vibration from the engine deck 30 to the tank deck 50 on the more laterally outer side than the slewing frame 10, the vibration occurring as the engine E operates.

Since such vibration transmission regulating unit 60 cuts off transmission of vibration from the engine deck 30 to the tank deck 50, the transmission of vibration from the engine deck 30 to the cab deck 40 is suppressed. As a result, the transmission of vibration from the engine E to the cab C is suppressed.

Additionally, the engine deck 30 includes the engine deck outer side member 33 and the engine deck front end member 31a. The engine deck outer side member 33 forms the laterally outer side portion of the engine deck 30. Then, the engine deck front end member 31a connects the front side end portion of the engine deck outer side member 33 and the slewing frame 10.

This configuration suppresses the front side end portion of the engine deck outer side member 33 from moving with respect to the slewing frame 10. For example, swing of the front side end portion of the engine deck outer side member 33 is suppressed in at least one of the lateral direction and the up-down direction with respect to the slewing frame 10.

The vibration transmission regulating unit 60 includes the gap S1 formed in the front-rear direction between the engine deck 30 and the tank deck 50. Therefore, with a simple configuration of the vibration transmission regulating unit 60, the transmission of vibration from the engine E to the cab C can be suppressed.

Modified Embodiments

The present invention is not limited to the above embodiment and the following modified embodiments can be adopted. The upper slewing body according to the present invention may not necessarily be provided with a part of the components of the above embodiment, and may have the number of components changed. For example, the same gap as the gap S1 may be further provided in the engine deck 30. For example, the side plate 15 may include three or more side plates. The engine deck front end member 31a may not necessarily be provided.

When the upper slewing body 1 is viewed from the rear side to the front side, the deck 20 is arranged on the right side of the slewing frame 10 in the example shown in FIG. 1, but the deck 20 may be arranged on the left side of the slewing frame 10. When viewed from the rear side to the front side, the engine deck 30, the cab deck 40, and the tank deck 50 need only be arranged on the same side as the slewing frame 10 (one of the right side and the left side).

While in the above embodiment, the vibration transmission regulating unit 60 is formed with the gap S1, the vibration transmission regulating unit may have a configuration other than the gap S1. The vibration transmission regulating unit 60 may include an object (member). For example, the vibration transmission regulating unit 60 may include an object formed of a material (vibration absorbing member) which is less likely to transmit vibration than a material forming the engine deck 30 and the tank deck 50, or formed of a member (plate) with low friction. The vibration transmission regulating unit 60 may include padding such as sponge or the like. The vibration transmission regulating unit 60 may include padding such as sponge arranged between the engine deck 30 and the tank deck 50 so as to suppress (or absorb) transmission of vibration from the engine deck 30 to the tank deck 50 via the padding, thereby making transmission of the vibration be as hard as possible. In place of the sponge, layered rubber or the like may be arranged between the engine deck 30 and the tank deck 50. As will be described later, the vibration transmission regulating unit 60 may include a mechanism which slidably connects the engine deck 30 and the tank deck 50 with each other in the front-rear direction.

The tank T may not be mounted on the tank deck 50 (also referred to as an intermediate deck) and an object other than the tank T (an intermediate deck mounting object) may be mounted. The intermediate deck mounting object is, for example, an object having substantially the same mass as the tank T, for example, a device, or for example, a structure.

Figure 4:
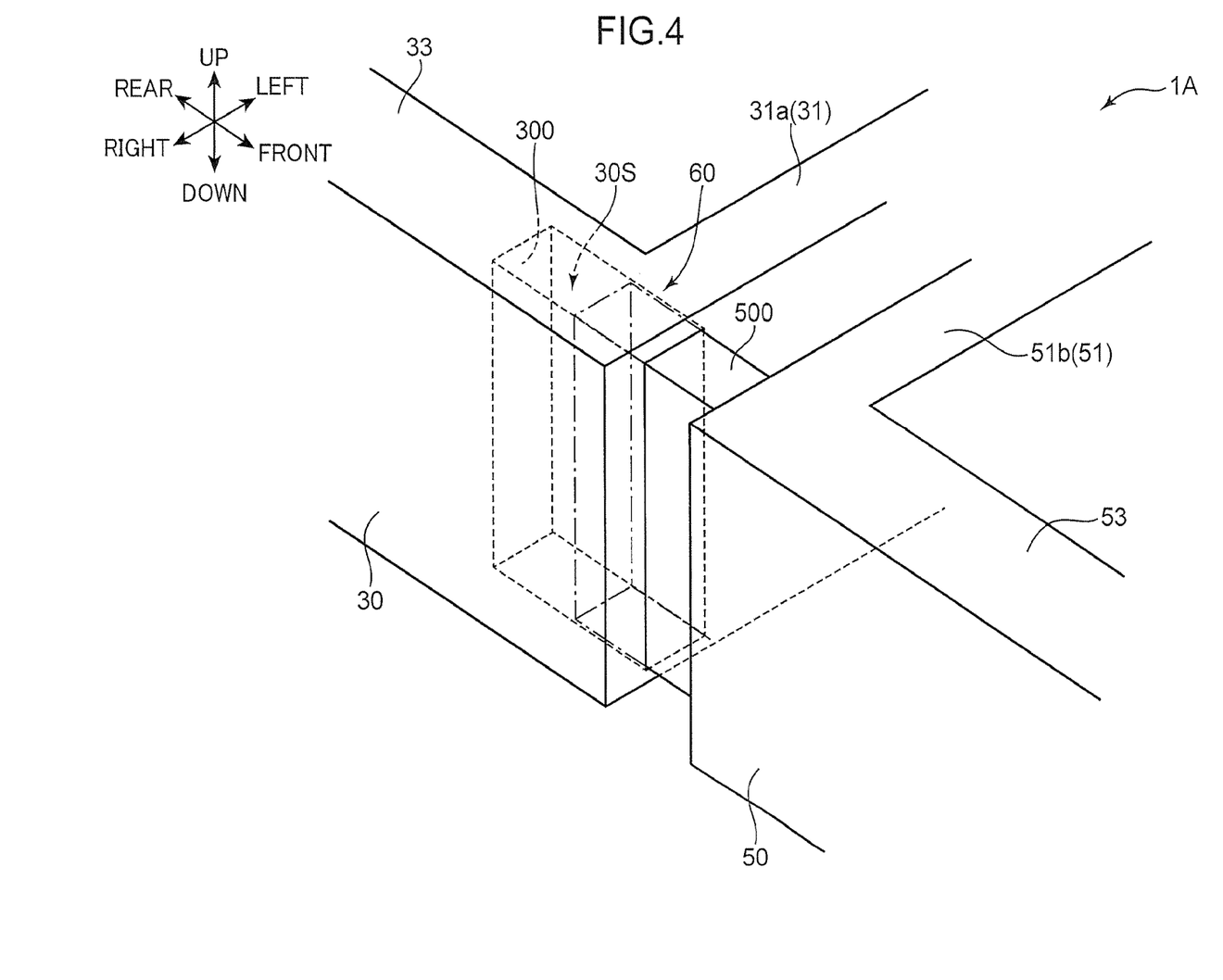
FIG. 4 is an enlarged perspective view showing a part of an engine deck and a tank deck of an upper slewing body according to a first modified embodiment of the present invention.
Figure 5:
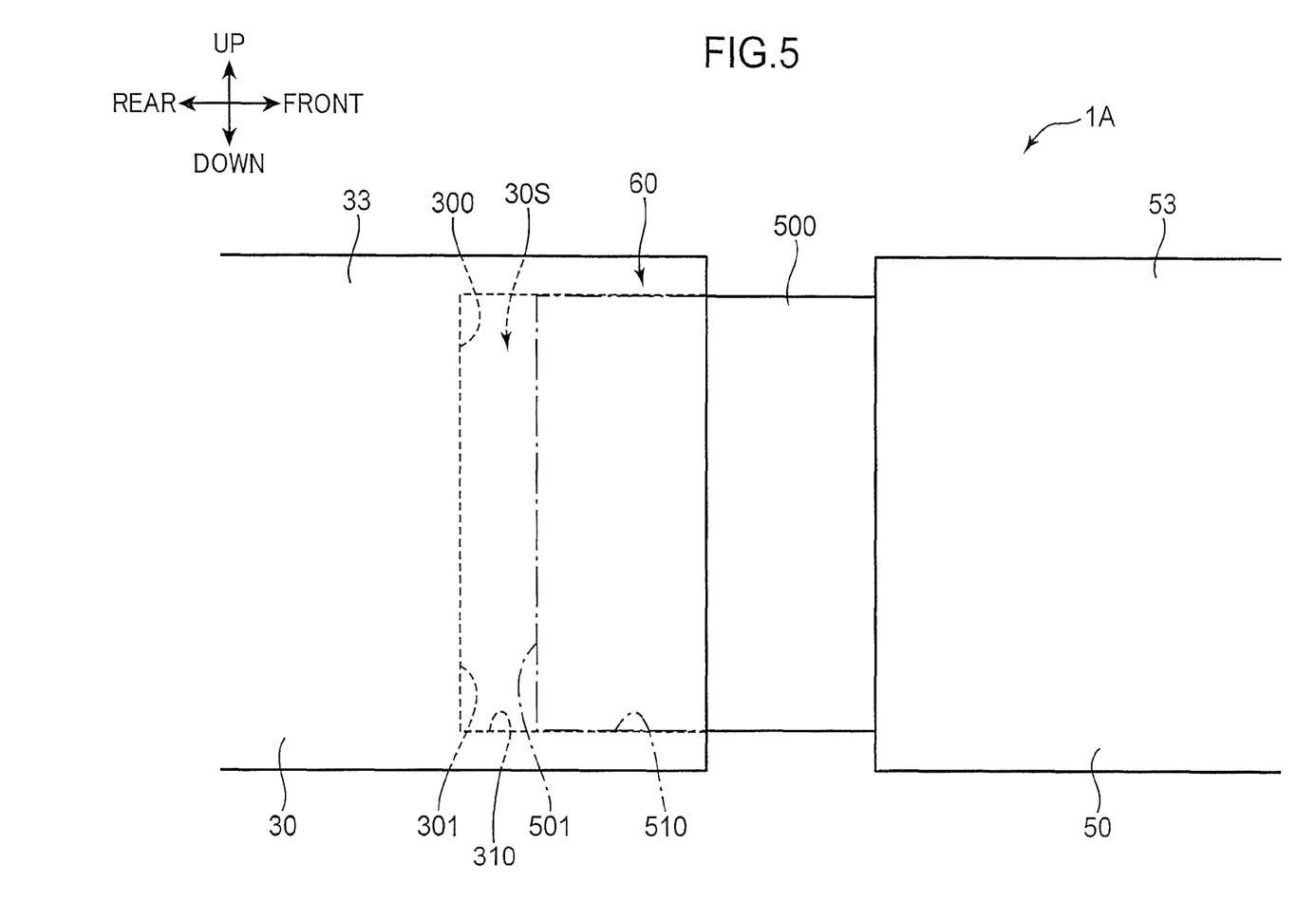
FIG. 5 is a side view of the upper slewing body shown in FIG. 4.

FIG. 4 is an enlarged perspective view showing a part of an engine deck 30 and a tank deck 50 of an upper slewing body 1A according to a first modified embodiment of the present invention. FIG. 5 is a side view of the upper slewing body 1A shown in FIG. 4. In FIG. 4 and FIG. 5, members having the same functions as those of the upper slewing body 1 according to the above embodiment are given the same reference codes as those of FIG. 1 and FIG. 2.

With reference to FIG. 4 and FIG. 5, the tank deck 50 has a tank deck rear end member 51b, a tank deck outer side member 53, and a protrusion 500. The protrusion 500 is provided to protrude backward from a part at which the tank deck rear end member 51b and the tank deck outer side member 53 intersect. Specifically, the protrusion 500 protrudes toward the engine deck 30. In the present modified embodiment, the protrusion 500 has a substantially rectangular solid-shape. The protrusion 500 has a front end surface 501 (FIG. 5) and a side portion 510. The front end surface 501 is arranged in a front end portion of the protrusion 500 in the front-rear direction and corresponds to a rear end surface of the protrusion 500. The front end surface 501 faces the front-rear direction. The side portion 510 extends along the front-rear direction and is also connected to the front end surface 501. The side portion 510 includes up, down, right and left surfaces.

On the other hand, the engine deck 30 has an inner surface portion 300. The inner surface portion 300 defines a recess 30S which allows the protrusion 500 to be inserted. The recess 30S is formed to have a substantially rectangular solid-shape. The inner surface portion 300 has an opposed surface 301 (FIG. 5) and an inner side surface 310. The opposed surface 301 is a surface obtained by most deeply recessing a part of the engine deck 30 backward and is arranged to be opposed to the front end surface 501 of the protrusion 500. The inner side surface 310 extends along the front-rear direction and is connected to the opposed surface 301. The inner side surface 310 includes up, down, right and left surfaces.

In the present modified embodiment, a vibration transmission regulating unit 60 is formed with the protrusion 500 and the inner surface portion 300. As shown in FIG. 4 and FIG. 5, the four surfaces of the side portion 510 of the protrusion 500 are in close contact with the four surfaces of the inner side surface 310 of the inner surface portion 300. On the other hand, the front end surface 501 of the protrusion 500 is arranged at an interval from the opposed surface 301 of the inner surface portion 300 in a front-rear direction (a first direction). According to such a configuration, when vibration of an engine E is transmitted to the surroundings of the vibration transmission regulating unit 60, the engine deck 30 and the tank deck 50 are allowed to slidably move relative to each other along the front-rear direction. At this time, direct transmission of a vibration component in the front-rear direction in the vibration is regulated from the engine deck 30 to the tank deck 50. Accordingly, transmission of vibration from the engine deck 30 to the tank deck 50 is reduced. As a result, the transmission of vibration from the engine E to a cab C can be suppressed. Additionally, since the side portion 510 of the protrusion 500 is supported by the inner side surface 310 of the inner surface portion 300 in an up-down direction and a right-left direction (both of which are a second direction), rigidity of a deck 20 can be improved as compared to the above embodiment.

Figure 6:
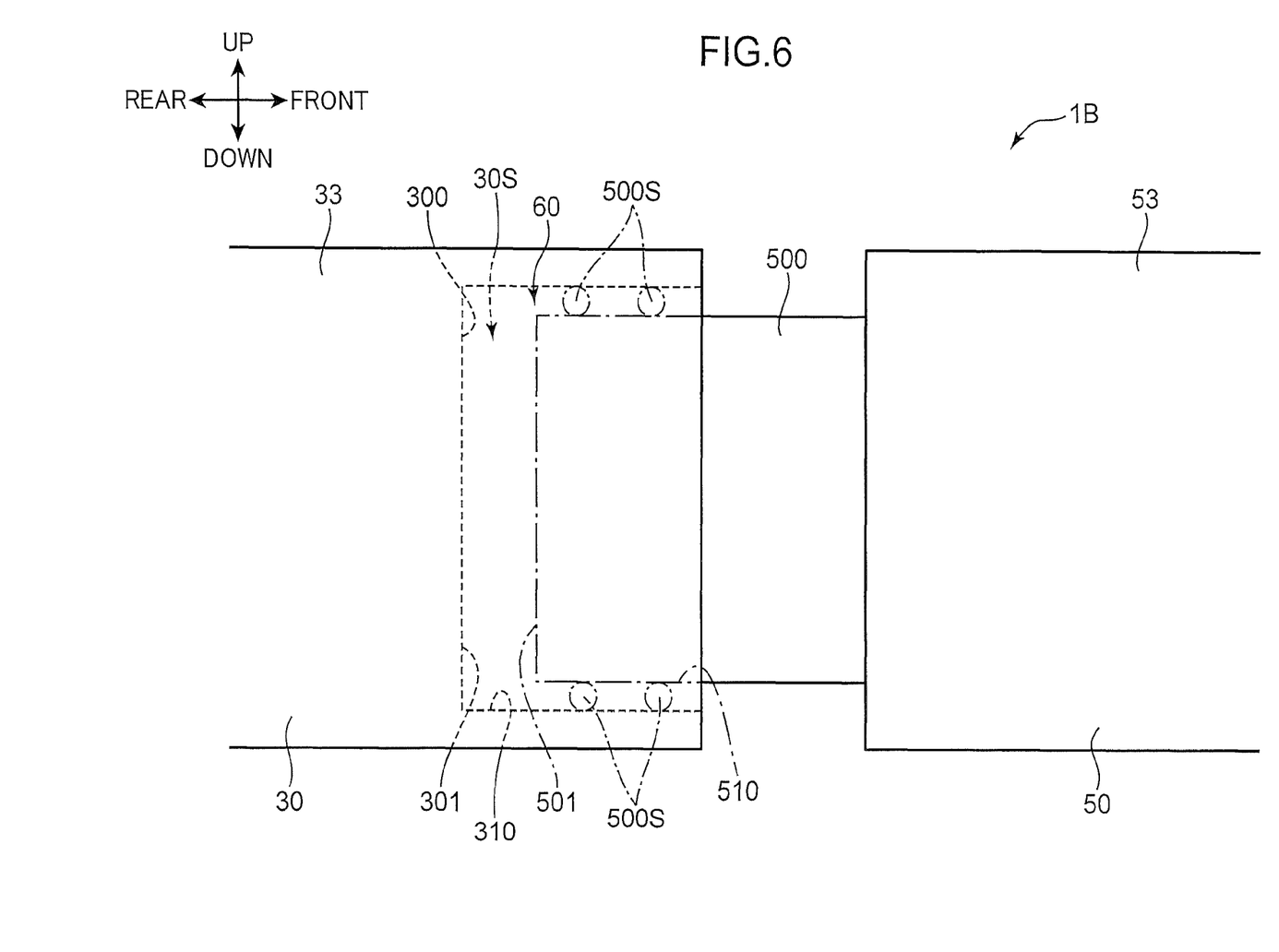
FIG. 6 is a side view showing a part of an engine deck and a tank deck of an upper slewing body according a second modified embodiment of the present invention.

FIG. 6 is a side view showing a part of an engine deck 30 and a tank deck 50 of an upper slewing body 1B according a second modified embodiment of the present invention. Since the present modified embodiment differs from the first modified embodiment in that a vibration transmission portion regulating unit 60 of the upper slewing body 1B has a plurality of rollers 500S, description will be made mainly with respect to the difference.

The plurality of rollers 500S are arranged to be slewable (rollable) between a side portion 510 of a protrusion 500 and an inner side surface 310 of an inner surface portion 300. Such a configuration facilitates relative sliding movement of the engine deck 30 and the tank deck 50 along the front-rear direction when the engine E operates. Therefore, transmission of vibration from the engine deck 30 to the tank deck 50 and further to the cab deck 40 can be further reduced. In place of the plurality of rollers 500S, a known slide rail or the like may be arranged.

Figure 7:
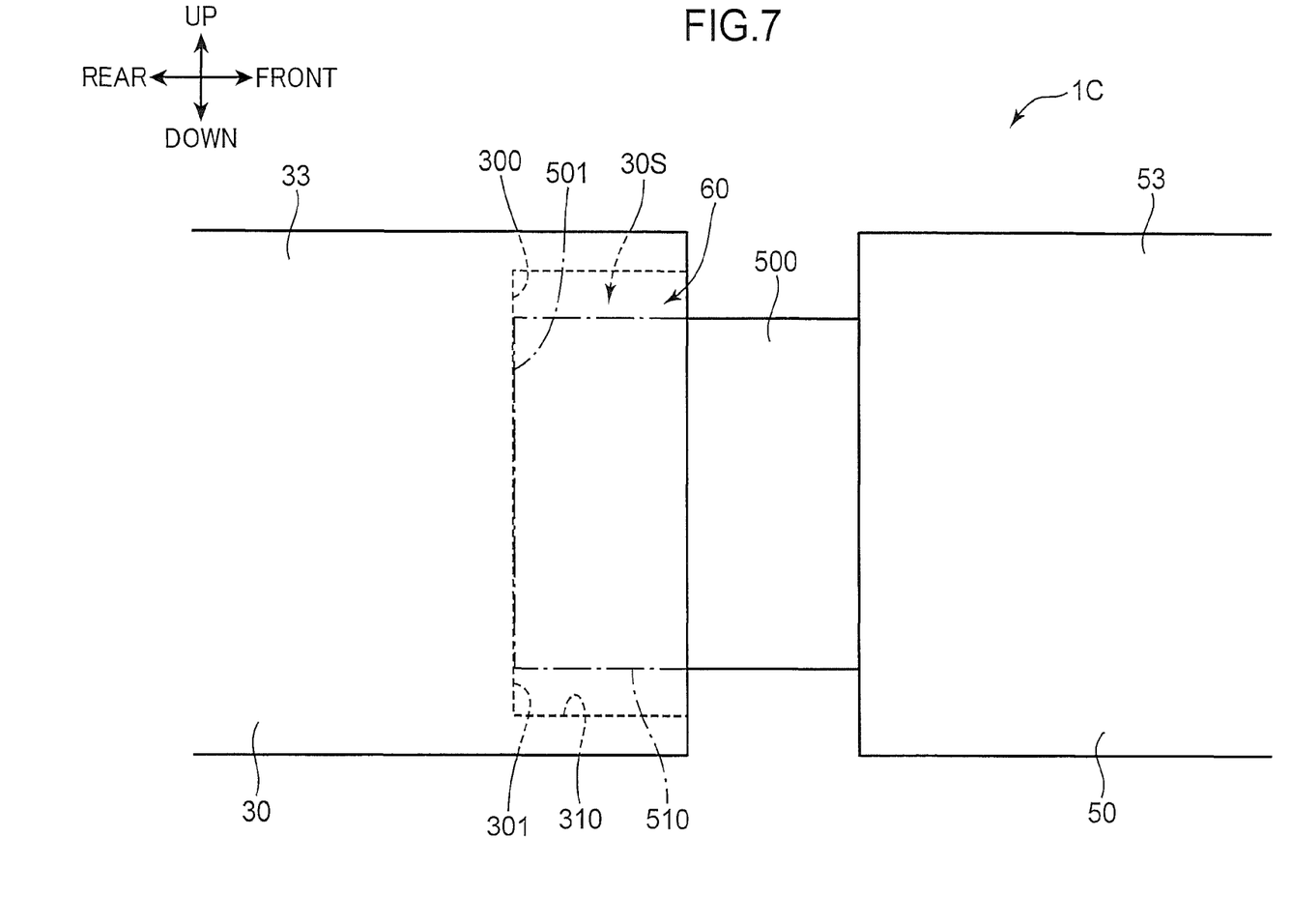
FIG. 7 is a side view showing a part of an engine deck and a tank deck of an upper slewing body according a third modified embodiment of the present invention.

FIG. 7 is a side view showing a part of an engine deck 30 and a tank deck 50 of an upper slewing body 1C according a third modified embodiment of the present invention. Since the present modified embodiment differs from the first modified embodiment in having a different contact position of a protrusion 500 and an inner surface portion 300, description will be made mainly with respect to the difference.

With reference to FIG. 7, in the present modified embodiment, a front end surface 501 of the protrusion 500 and right and left side surfaces of a side portion 510 are in close contact with an opposed surface 301 of the inner surface portion 300 and right and left side surfaces of an inner side surface 310. On the other hand, upper and lower surfaces of the side portion 510 of the protrusion 500 are arranged at an interval in an up-down direction (a first direction) from upper and lower surfaces of the inner side surface 310 of the inner surface portion 300, respectively. According to such a configuration, when vibration of an engine E is transmitted to the surroundings of a vibration transmission regulating unit 60, the engine deck 30 and the tank deck 50 are allowed to slidably move relative to each other along the up-down direction. At this time, direct transmission of a vibration component in the up-down direction in the vibration from the engine deck 30 to the tank deck 50 is regulated. Accordingly, transmission of vibration from the engine deck 30 to the tank deck 50 is reduced. As a result, the transmission of vibration from the engine E to a cab C can be suppressed. Additionally, since the front end surface 501 of the protrusion 500 and the right and left side surfaces of the side portion 510 are supported by the opposed surface 301 of the inner surface portion 300 and the right and left side surfaces of the inner side surface 310 in a front-rear direction and a right-left direction (both of which are a second direction), rigidity of a deck 20 can be improved as compared to the above embodiment. One of the front end surface 501 of the protrusion 500 and the right and left side surfaces of the side portion 510 may be supported by one of the opposed surface 301 of the inner surface portion 300 and the right and left side surfaces of the inner side surface 310. Additionally, the protrusion 500 may be configured to be slidably movable along the right-left direction relative to the inner surface portion 300.

As described above, in the modified embodiments according to the present invention, the vibration transmission regulating unit is formed with the protrusion and the inner surface portion. Then, the protrusion and the inner surface portion inserted into the recess are arranged at an interval from each other in the first direction so as to be relatively movable along the first direction such that direct transmission of a vibration component in a predetermined first direction in vibration from the engine deck to the tank deck is regulated, and the inner surface portion supports the protrusion at least in the second direction intersecting the first direction.

While the first to third modified embodiments have been described with respect to a mode in which the tank deck 50 has the protrusion 500 and the recess 30S is formed in the engine deck 30, the same protrusion as the protrusion 500 may protrude from the engine deck 30 and the same recess as the recess 30S may be formed in the tank deck 50.

The invention claimed is:
1. An upper slewing body comprising:
a slewing frame slewable around a rotation shaft extending in an up-down direction;
an engine deck arranged to be opposed to the slewing frame in a lateral direction intersecting a front-rear direction and the up-down direction, and fixed to the slewing frame to support an engine;
a cab deck arranged on the same side as the engine deck in the lateral direction and arranged forward of the engine deck and fixed to the slewing frame to support a cab;
a tank deck arranged on the same side as the engine deck in the lateral direction and arranged forward of the engine deck and rearward of the cab deck and fixed to the slewing frame to support a tank; and
a vibration transmission regulating unit which regulates direct transmission of vibration from the engine deck to the tank deck on a laterally outer side of the slewing frame, the vibration occurring as the engine operates.
2. The upper slewing body according to claim 1, wherein the engine deck has an engine deck front end member extending in the lateral direction and connected to the slewing frame to define a front surface portion of the engine deck, the tank deck has a tank deck rear end member extending in the lateral direction and connected to the slewing frame to define a rear surface portion of the tank deck, and the vibration transmission regulating unit is formed with the engine deck front end member and the tank deck rear end member.

3. The upper slewing body according to claim 2, wherein the engine deck front end member and the tank deck rear end member are arranged at an interval in the front-rear direction over an entire area in the lateral direction and the up-down direction so as to regulate direct transmission of a vibration component from the engine deck to the tank deck, the vibration component being of the vibration in every direction including the front-rear direction, the up-down direction, and the lateral direction.

4. The upper slewing body according to claim 3, wherein the engine deck further has an engine deck outer side member which extends in the front-rear direction and defines a laterally outer side portion of the engine deck, and the engine deck front end member connects a front end portion of the engine deck outer side member and the slewing frame in the lateral direction.

5. The upper slewing body according to claim 1, wherein one of the engine deck and the tank deck has a protrusion protruding toward the other one of the engine deck and the tank deck, the other of the decks has an inner surface portion which defines a recess that allows the protrusion to be inserted, the vibration transmission regulating unit is formed with the protrusion and the inner surface portion, and the protrusion and the inner surface portion inserted into the recess are arranged at an interval from each other in the first direction so as to be relatively movable in the first direction such that direct transmission of a vibration component in a predetermined first direction in the vibration from the engine deck to the tank deck is regulated, and the inner surface portion supports the protrusion at least in the second direction intersecting the first direction.

6. The upper slewing body according to claim 5, wherein the protrusion has a front end surface arranged in a front end portion in the front-rear direction, and a side portion extending in the front-rear direction and connected to the front end surface, the inner surface portion has an opposed surface arranged so as to be opposed to the front end surface, and an inner side surface extending in the front-rear direction and connected to the opposed surface, and the front end surface and the opposed surface are arranged at an interval from each other in the front-rear direction so as to regulate direct transmission of a vibration component in the front-rear direction in the vibration from the engine deck to the tank deck, and the inner side surface supports the side portion at least in a direction intersecting the front-rear direction.

* * * * *